(12) United States Patent
Yanovsky

(10) Patent No.: US 7,310,815 B2
(45) Date of Patent: Dec. 18, 2007

(54) METHOD AND APPARATUS FOR DATASTREAM ANALYSIS AND BLOCKING

(75) Inventor: Boris Yanovsky, Saratoga, CA (US)

(73) Assignee: SonicWall, Inc., Sunnyvale, CA (US)

( * ) Notice: Subject to any disclaimer, the term of this patent is extended or adjusted under 35 U.S.C. 154(b) by 613 days.

(21) Appl. No.: 10/697,846

(22) Filed: Oct. 29, 2003

(65) Prior Publication Data

US 2005/0097358 A1  May 5, 2005

(51) Int. Cl.
*G06F 15/16* (2006.01)
*G06F 17/00* (2006.01)

(52) U.S. Cl. ................. 726/13; 709/231; 726/24

(58) Field of Classification Search .......... 726/13, 726/24; 709/231
See application file for complete search history.

(56) References Cited

U.S. PATENT DOCUMENTS

| | | | | |
|---|---|---|---|---|
| 6,088,803 | A * | 7/2000 | Tso et al. | 726/22 |
| 6,119,236 | A * | 9/2000 | Shipley | 726/22 |
| 6,178,448 | B1 * | 1/2001 | Gray et al. | 709/224 |
| 6,219,706 | B1 * | 4/2001 | Fan et al. | 709/225 |
| 6,449,723 | B1 * | 9/2002 | Elgressy et al. | 726/22 |
| 2003/0145228 | A1 | 7/2003 | Suuronen et al. | |
| 2004/0093513 | A1 * | 5/2004 | Cantrell et al. | 713/201 |

FOREIGN PATENT DOCUMENTS

EP  1 122 932 A  8/2001
WO  WO97/39399 A  10/1997

OTHER PUBLICATIONS

The Ultimate Internet Sharing Solution, WinProxy, User Manual, Copyright 1996-2002 Osistis Software, Inc., dated Feb. 2002 (290 pgs).
Snort Users Manual, Snort Release 2.0.0, M. Roesch, C. Green, Copyright 1998-2003 M. Roesch, Copyright 2001-2003 C. Green, Copyright 2003 Sourcefire, Inc. dated Dec. 8, 2003 (53 pgs).
Firewall-Friendly FTP, Network Working Group, S. Bellovin, AT&T Bell Laboratories, Feb. 1994 (4 pp) dated Jul. 15, 2002.
European Search Report, Application No. EP 04 02 5579, May 23, 2005.

* cited by examiner

Primary Examiner—Matthew Heneghan
(74) Attorney, Agent, or Firm—Blakely, Sokoloff, Taylor & Zafman LLP

(57) ABSTRACT

A method and apparatus for datastream analysis and blocking. According to one embodiment of the invention, a network access device, analyzes (without proxying) each of a stream of packets traversing a single connection through the network access device from an external host to a protected host. In addition, the network access device forwards each allowed packet of the stream of packets as long as the connection is active. However, if one of the stream of packets is determined to be disallowed as a result of the analyzing, then the network access device discards the disallowed packet and terminates the connection, causing the protected host to discard those packets received on the terminated connection.

44 Claims, 10 Drawing Sheets

METHOD AND APPARATUS FOR DATASTREAM ANALYSIS AND BLOCKING

BACKGROUND OF THE INVENTION

1. Field of the Invention

The invention relates to the field of computer networks. More specifically, the invention relates to computer network security.

2. Background of the Invention

FIG. 1 (Prior Art) is a diagram illustrating a proxy firewall analyzing packets. In FIG. 1, an external host 105 establishes a connection 104 to a proxy firewall 103. The proxy firewall 103 establishes a connection 102 to a protected host 101 on behalf of the external host 105. The proxy firewall 103 communicates with the protected host 101 on behalf of the external host 105. The proxy firewall 103 also communicates with the external host 105 on behalf of the protected host 101. At a time 1, the external host 105 transmits a packet A to the proxy firewall 103. The proxy firewall 103 receives the packet A and analyzes the packet A at a time 2. The proxy firewall 103 may analyze the packet's payload, or both the header and the payload. As a proxy, the proxy firewall 103 acts as the protected host 101 and analyzes the packet As payload at the application level. Hence, the proxy firewall 103 must support the application level protocols relevant to packet A. If packet A is determined to be allowed, then at a time 3.1, the packet A is reencapsulated and transmitted to the protected host 101. If the packet A is determined to be disallowed, then at a time 3.2 the packet A is discarded.

Although the proxy firewall is able to analyze the header and the payload of the packet, this technique of analysis is inefficient. In particular, the proxy firewall introduces a great amount of latency with the traffic since the proxy firewall is communicating on behalf of the external host and the protected host. Packets are slowed since they are traversing two connections. The latency introduced by the two connections provides the proxy firewall 103 the necessary time to analyze the payload. In addition, to perform analysis of the payload, the proxy firewall 103 must support higher level protocols in order to decapsulate, analyze, and re-encapsulate the packet. Supporting the higher level protocols further increases latency and increases the cost and complexity of the firewall.

FIG. 2 (Prior Art) is a diagram illustrating packet analysis with a sniffer. In FIG. 2, an external host 205 establishes a connection 202 to a protected host 201 through a firewall 203. At a time 1, a packet A is transmitted from the external host 205. At a time 2, the firewall 203 analyzed the packet A. A sniffer 207 sniffs packets that are transmitted from the external host 205 to the firewall 203. Although the sniffer 207 is illustrated as sniffing packets transmitted from the external host 205 to the firewall 203, the sniffer 207 can also sniff packets transmitted from the firewall 203 to the protected host 201. At a time 2, the sniffer 207 sniffs the packet A and analyzes the payload of the packet A. As with a proxy firewall, the sniffer 207 must support higher level protocols relevant to the packet A in order to analyze the payload of the packet A. If the packet A is an allowed packet, then the sniffer 207 simply discards the packet A. If the packet A is a disallowed packet, then the sniffer 207 transmits an alarm 209. The alarm 209 may be transmitted to the firewall 203, an administrative work station, the protected host 201, etc.

In addition to the protection offered by the sniffer 207, the firewall 203 analyzes packets traversing the connection 202. Whether the firewall 203 implements packet filtering or stateful packet inspection, the firewall 203 only analyzes the header of the packet A. If the firewall 203 determines that the packet A is allowed, then at a time 3 the firewall 203 forwards the packet A to the protected host 201. If the firewall 203 determines that the packet A is disallowed, then the packet A is discarded. Unfortunately, the connection 202 remains open even though the packet A is determined to be disallowed. Hence, additional packets can still traverse the connection 202. Although the firewall 203 discards disallowed packets, disallowed packets may continue to be transmitted on the connection 202. As long as the connection 202 remains open, the risk of the firewall 203 being penetrated increases.

Although the sniffer technique enables analysis of packet headers and payloads without impacting transmission time by performing packet payload analysis in the sniffer 207 instead of the firewall 203, the packet payload analysis provided by the sniffer 207 only provides notification and does not prevent infection. By the time the sniffer detects that a packet is disallowed, the packet has already been transmitted to its destination. The sniffer technique provides notification of a threatening connection, but does not block disallowed packets.

BRIEF SUMMARY OF THE INVENTION

A method and apparatus for datastream analysis and blocking is described. According to one embodiment of the invention, a network access device, analyzes (without proxying) each of a stream of packets traversing a single connection through the network access device from an external host to a protected host. In addition, the network access device forwards each allowed packet of the stream of packets as long as the connection is active. However, if one of the stream of packets is determined to be disallowed as a result of the analyzing, then the network access device discards the disallowed packet and terminates the connection, causing the protected host to discard those packets received on the terminated connection.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings.

DETAILED DESCRIPTION OF THE INVENTION

In the following description, numerous specific details are set forth to provide a thorough understanding of the invention. However, it is understood that the invention may be practiced without these specific details. In other instances, well-known circuits, structures, standards, and techniques have not been shown in detail in order not to obscure the invention.

Figure 1:
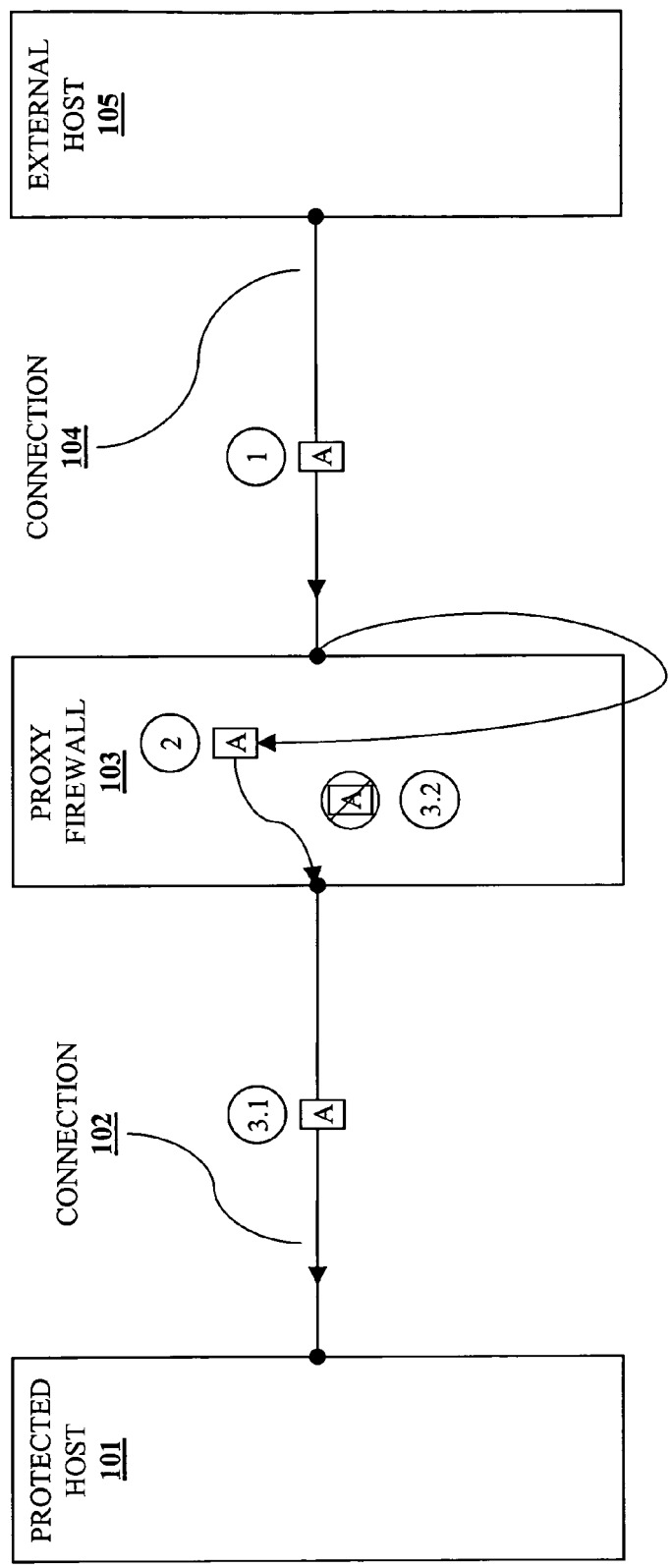
FIG. 1 (Prior Art) is a diagram illustrating a proxy firewall analyzing packets.
Figure 2:
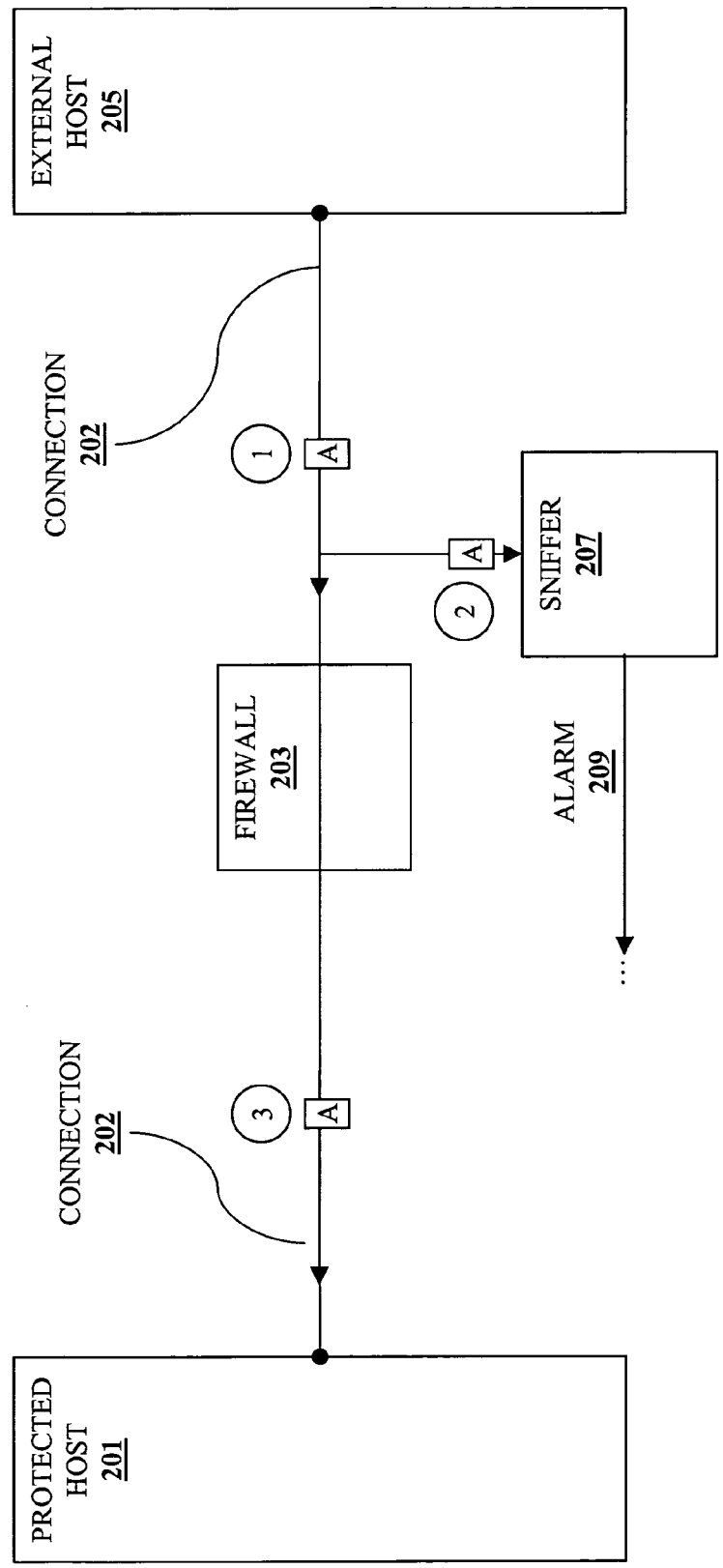
FIG. 2 (Prior Art) is a diagram illustrating packet analysis with a sniffer.
Figure 3:
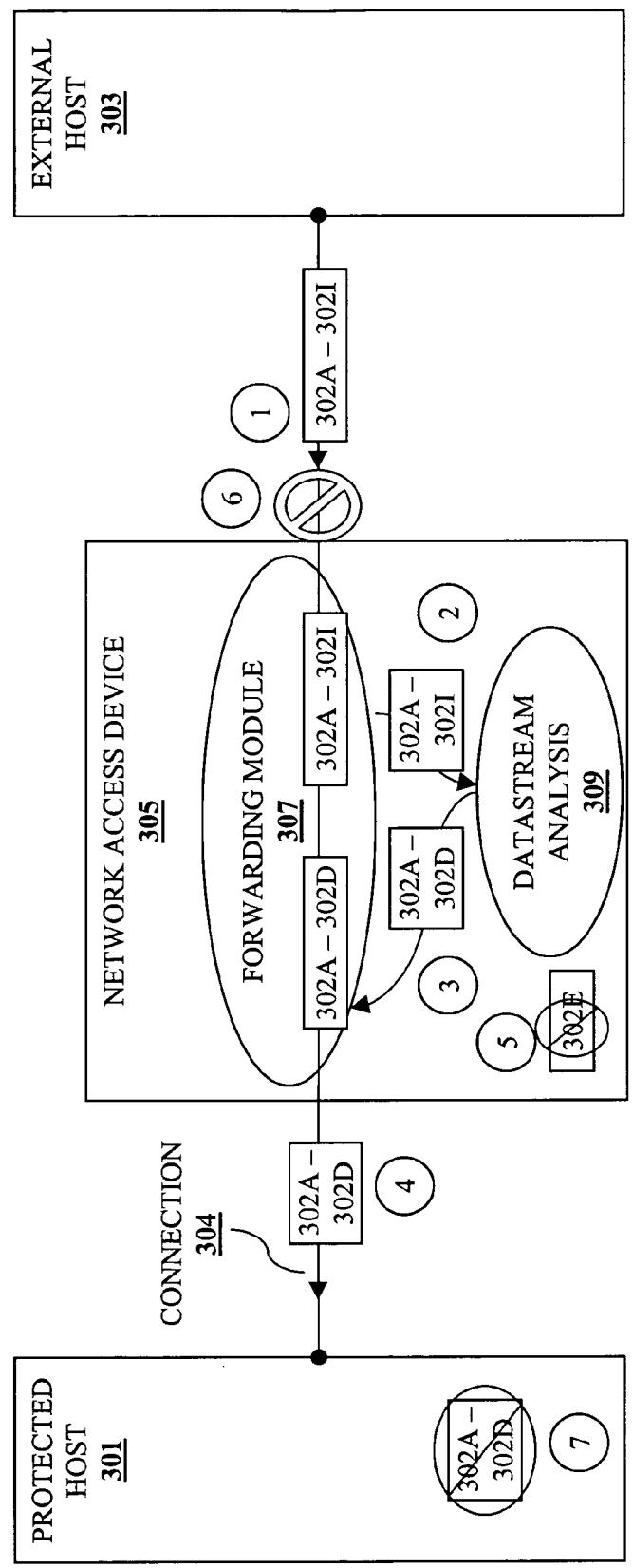
FIG. 3 is an exemplary diagram illustrating datastream packet header analysis according to one embodiment of the invention.

FIG. 3 is an exemplary diagram illustrating datastream analysis according to one embodiment of the invention. In FIG. 3, an external host 303 has established a connection 304 with a protected host 301. The connection 304 traverses a network access device 305 that supports the connection 304. The network access device includes a forwarding module 307 and a datastream analysis module 309.

At a time 1, the external host 303 transmits a set of packets 302A-302I along the connection 304. At a time 2, the datastream analysis module 309 analyzes each of the packets 302A-302E and determines the packet 302E to be a disallowed packet. The datastream analysis module 309 does not analyze packets 302F-302I after determining packet 302E to be a disallowed packet. In alternative embodiment of the invention, the packets 302E-302I are analyzed as substantially the same time. In such an embodiment, in response to one of the packets 302E-302I being determined as disallowed, analysis of remaining packets is discontinued. The packet 302E may be disallowed because its header identifies a disallowed source IP address, its payload contains disallowed data, or its payload is the last part of a disallowed file. The analysis may be packet header analysis, packet payload block analysis, packet payload file analysis, or a combination of analysis techniques. With packet header analysis, headers of packets are analyzed. With packet payload block analysis, the payloads of packets are analyzed on a per packet basis. With packet payload file analysis, payloads of packets that form a file are collected and assembled in order for the file to be analyzed. Each of the analysis techniques will be described in more detail below.

While in one embodiment of the invention the forwarding module and the datastream analysis module pass an identifier, pointer, or address to a memory location where a packet is stored, in alternative embodiments of the invention the datastream analysis module 309 copies packets to a different memory location.

At a time 3, the datastream analysis module 309 indicates to the forwarding module 307 that the packets 302A-302D are allowed. At a time 4, the forwarding module 307 forwards the packets 302A-302D along the connection 304 to the protected host 301. At a time 5, the network access device 305 discards the packet 302E. In one embodiment of the invention, the datastream analysis module 309 discards the packet 302E. In alternative embodiments of the invention, the forwarding module 307 discards the packet 302E after the datastream analysis module 309 indicates that the packet 302E is disallowed. In another embodiment of the invention, the packet 302E is stored for logging and investigative purposes.

At a time 6, the network access device 303 terminates connection 304. Since the traffic is flowing through the Network Access Device, embodiments of the invention can terminate the traffic in a variety of ways (e.g., simulate each of the devices and send a reset packet to the other device; stop forwarding all the traffic on a particular connection, in order to force each of the devices on either side of the connection to go through the Timeout sequence and shut down the connection; etc.). Since the connection 304 is terminated, the external host 303 must establish a new connection with the protected host 301 in order to send more disallowed packets. Since a connection from the external host 303 has already transmitted disallowed packets, the network access device 305 may deny access to the protected host 301 from the external host 303. In addition, resources of the network access device 305 will not be spent processing additional disallowed traffic from the external host 303 since the connection 304 has been terminated. At a time 7, the protected host 301 discards the packets 302A-302D since the connection 304 has been terminated.

In addition to preserving performance of the network access device by terminating the connection, analyzing packets as described in FIG. 3 protects a host without having to establish and maintain two connection as with a proxy firewall. Therefore, datastream analysis can block packet based attacks, provide intrusion detection, provide content filtering and anti-virus protection without introducing the latency of two connections as with a proxy firewall and without expending resources analyzing packets traversing a connection already deemed threatening. The datasteam analysis module can optionally send a notification after the intrusion and/or unauthorized content after blocking an intrusion and/or unauthorized content.

Figure 4:
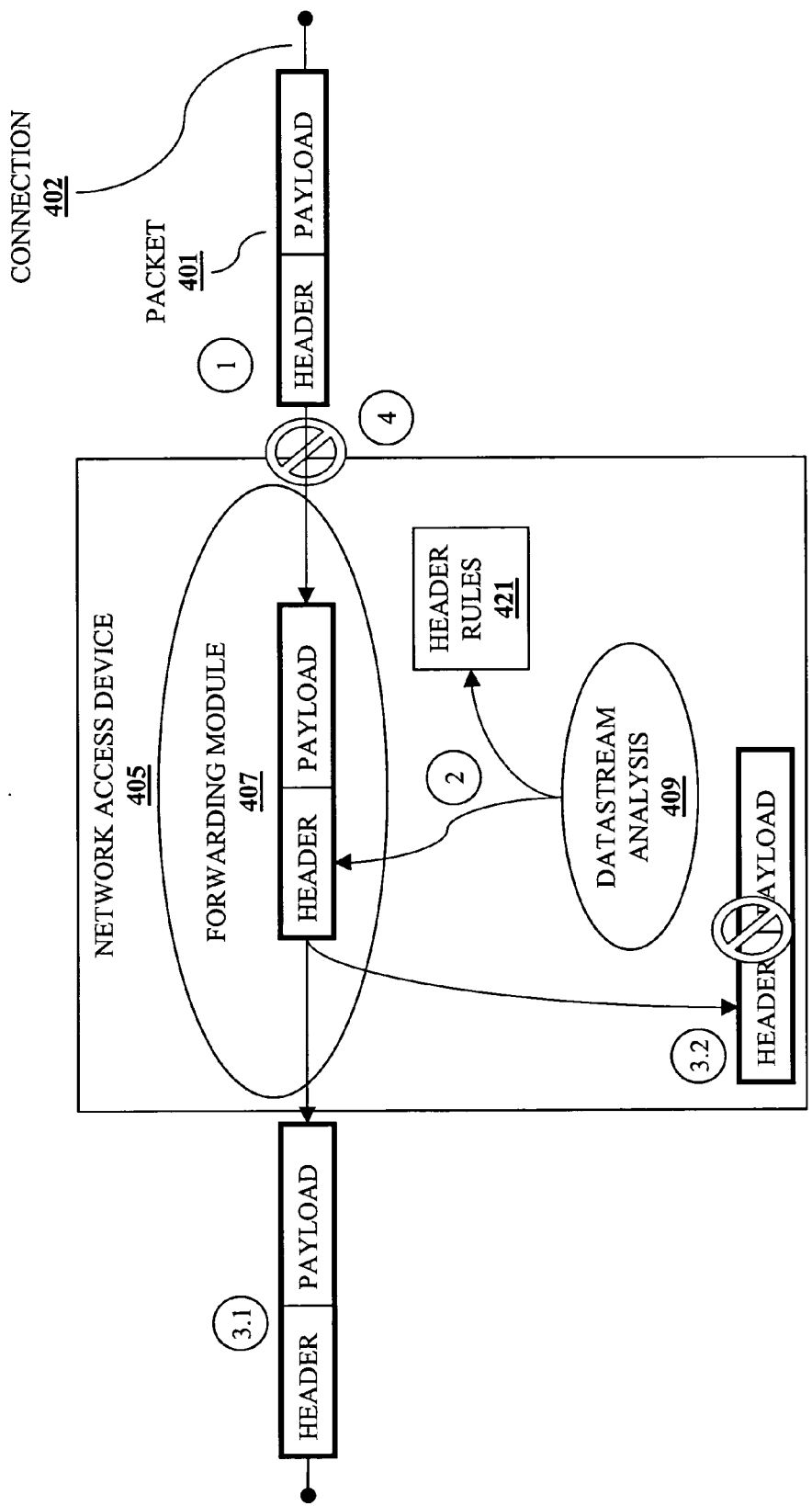
FIG. 4 is an exemplary diagram illustrating a network access device performing datastream packet payload block analysis according to one embodiment of the invention.

FIG. 4 is an exemplary diagram illustrating datastream packet header analysis according to one embodiment of the invention. In FIG. 4, a connection 402 traverses a network access device 405 that supports the connection 402. The network access device 405 includes a forwarding module 407 and a datastream analysis module 409. The datastream analysis module 409 analyzes packets received by the network access device 405 to determine whether packets are allowed or disallowed. The forwarding module 407 receives packets and forwards those packets that the datastream analysis module 409 determines to be allowed. Those packets that are determined to be disallowed by the datastream analysis module 409 are discarded and the connection 402 terminated.

The datastream analysis module 409 in FIG. 4 determines whether a packet is allowed or disallowed by using one or more techniques involving the header of a packet. In one embodiment, the datastream analysis module 409 inspects headers of packets against a packet filter. A packet filter is a set of rules identifying permitted and/or restricted source addresses. The set of rules may be enhanced with more advanced rules than permitted/restricted source addresses, such as permitted/restricted ports and/or services. In another embodiment of the invention, the datastream analysis module 409 performs stateful packet inspection.

In the example illustrated in FIG. 4, at a time 1, a packet 401 is transmitted along the connection 402. Before the forwarding module 407 can forward the packet 401, at a time 2 the datastream analysis module inspects the header of the packet 401 against a set of header rules 421 (e.g., a table for stateful packet inspection, a packet filter, etc.). If the datastream analysis module 409 determines the packet 401 to be an allowed packet, then at a time 3.1 the forwarding module 407 forwards the packet 401 along the connection 402. If the datastream analysis module 409 determines the packet 401 to be a disallowed packet, then at a time 3.2, the packet 401 is discarded and at a time 4, the threatening connection 402 is terminated.

Providing firewall protection as described in FIG. 4 blocks a threatening connection, thus blocking packet based attacks. In addition, providing firewall protection as described in FIG. 4 provides intrusion detection and site restriction without implementing relatively complex and costly proxy services and without introducing latency from multiple connections and processing packets at higher protocols as in proxy firewalls.

Figure 5:
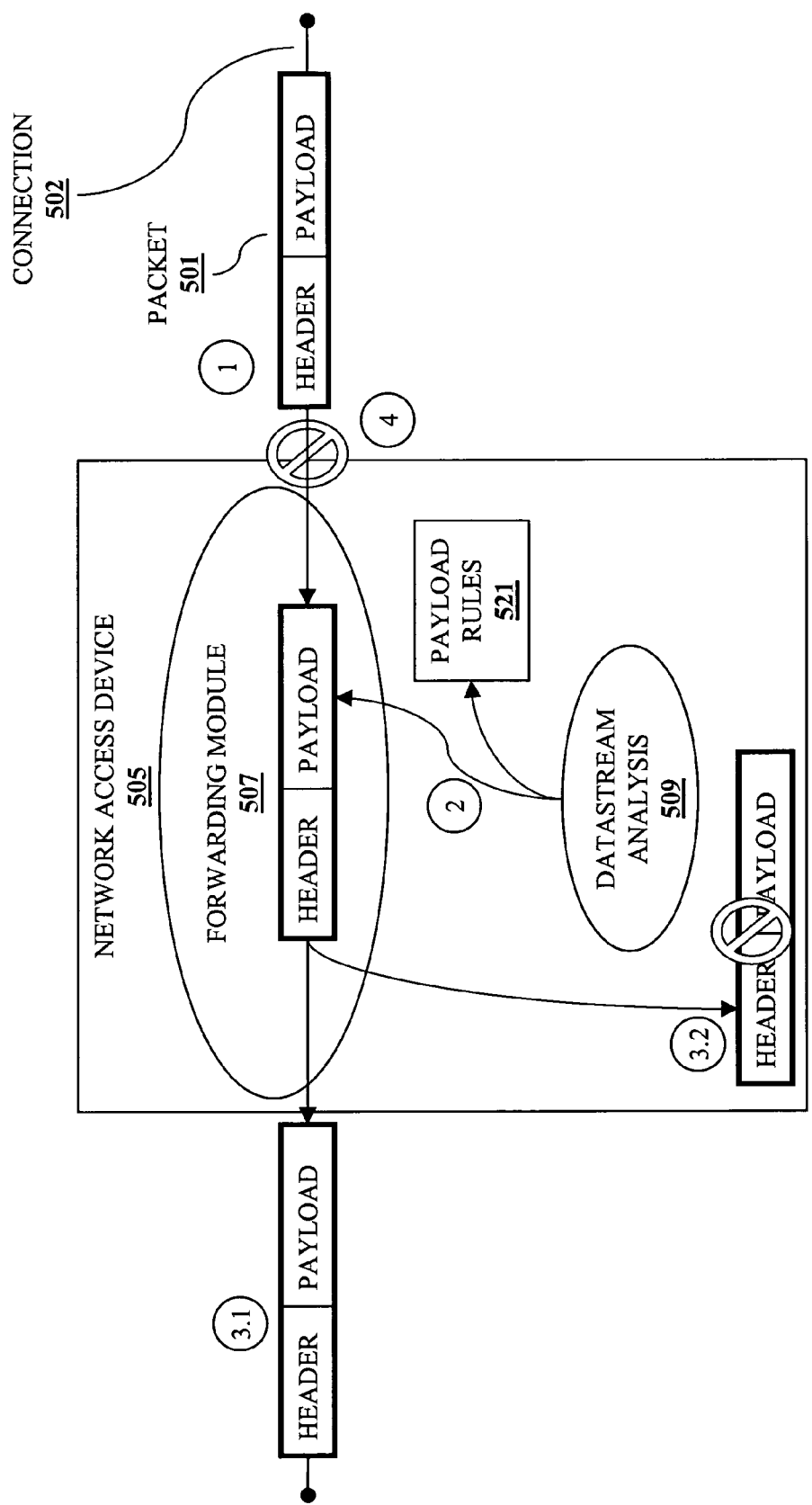
FIG. 5 is an exemplary diagram illustrating a network access device performing datastream packet payload file analysis according to one embodiment of the invention.

FIG. 5 is an exemplary diagram illustrating a network access device performing datastream packet payload block analysis according to one embodiment of the invention. In FIG. 5, a connection 502 traverses a network access device 505 that supports the connection 502. The network access device 505 includes a forwarding module 507 and a datastream analysis module 509. The datastream analysis module 509 analyzes packets received by the network access device 505 to determine whether packets are allowed or disallowed. The forwarding module 507 receives packets and forwards those packets that the datastream analysis module 509 determines to be allowed. Those packets that are determined to be disallowed by the datastream analysis module 509 are discarded and the connection 502 terminated. The datastream analysis module 509 in FIG. 5 determines whether a packet is allowed or disallowed by inspecting data in the payload of a packet.

In the example illustrated in FIG. 5, at a time 1, a packet 501 is transmitted along the connection 502. Before the forwarding module 507 can forward the packet 501, at a time 2, the datastream analysis module inspects the payload of the packet 401 against a set of payload rules 521 (e.g., the payload includes a restricted text string, a restricted URL, threatening script, etc.). Different techniques can be used for the datastream analysis module 509 to inspect the payload of the packet 501. In one embodiment of the invention, a pointer to the payload is provided to the datastream analysis module 509. In another embodiment of the invention, the datastream analysis module 509 copies the payload of the packet 501 and can either discard the copied payload whether or not the packet 501 is determined to be allowed or disallowed or store the copy for logging, statistical or other analytical purposes.

If the datastream analysis module 509 determines the packet 501 to be an allowed packet, then at a time 3.1 the forwarding module 507 forwards the packet 501 along the connection 502. If the datastream analysis module 509 determines the packet 501 to be a disallowed packet, then at a time 3.2 the packet 501 is discarded and at a time 4 the threatening connection 502 is terminated.

Providing firewall protection as described in FIG. 5 blocks a threatening connection thus blocking packet based attacks. In addition, providing firewall protection as described in FIG. 4 provides intrusion detection and site restriction without implementing relatively complex and costly proxy services and without introducing latency from multiple connections and processing packets at higher protocols as in proxy firewalls.

The datastream packet payload block analysis described in FIG. 5 enables intrusion detection and content filtering without introducing latency or introducing relatively little latency from analyzing packet payloads in contrast to proxy firewalls. Datastream packet payload block analysis blocks an intrusion and/or unauthorized content and does not allow a packet based intrusion and/or unauthorized content to continue to flow into the network access device, thus avoiding utilization of resources of the network access device analyzing packets of a connection already deemed threatening.

Figure 6:
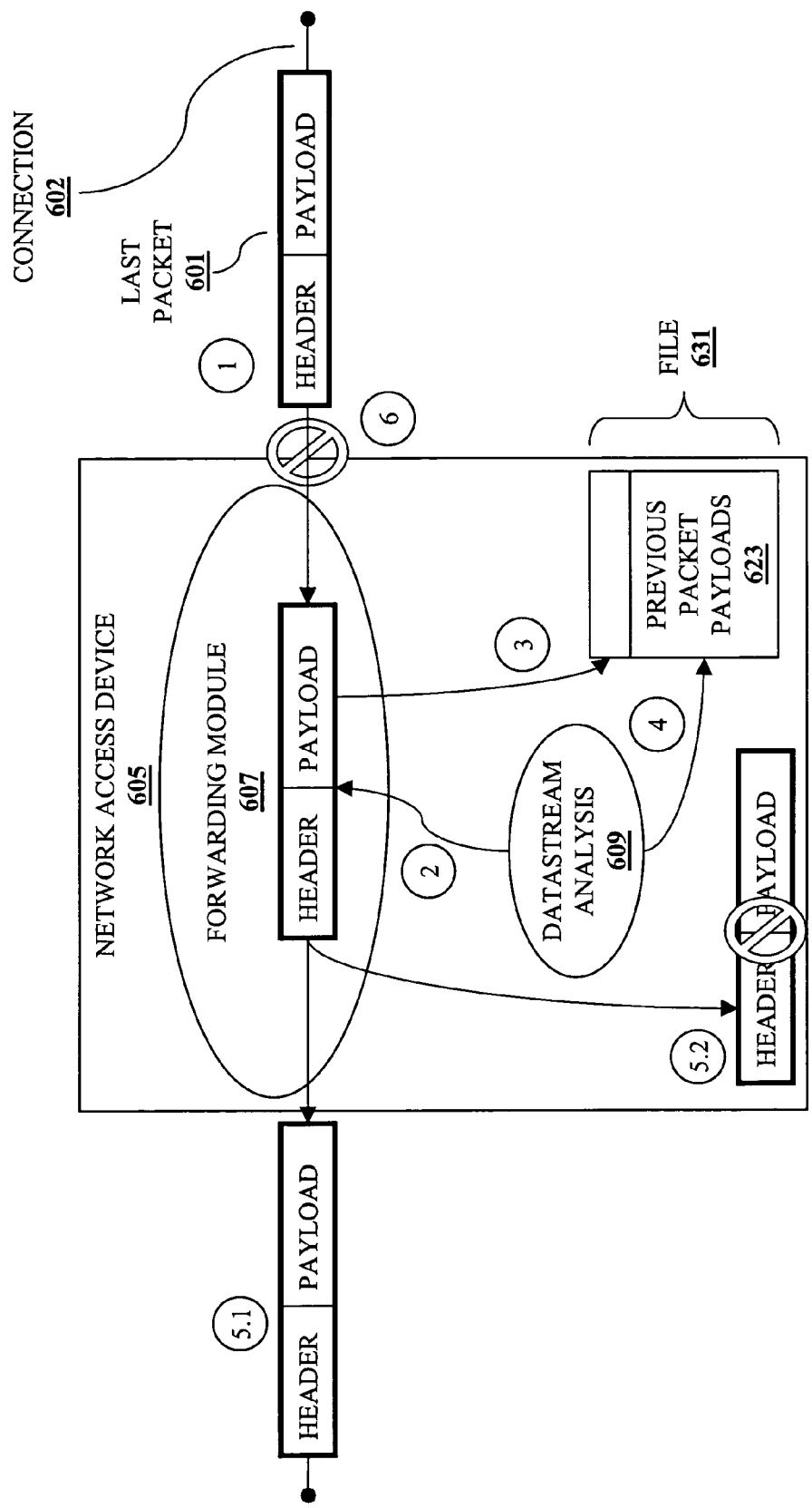
FIG. 6 is an exemplary diagram illustrating fragmented packet transmission according to one embodiment of the invention.

FIG. 6 is an exemplary diagram illustrating a network access device performing datastream packet payload file analysis according to one embodiment of the invention. In FIG. 6, a network access device 605 supports a connection 602 between an external host and a protected host that are not illustrated. The network access device 605 includes a forwarding module 607 and a datastream analysis module 609.

It is typical for an external host to send to the protected host a stream of packets whose payloads collectively form a file. Unfortunately, such a file may contain a virus that will infect the protected host. In an effort to avoid such an infection, the network access device 605 performs a virus scan prior to the protected host's receipt of an entire file. In one embodiment, with the exception of one or more of the final packets of the stream (the set of one or more hold back packets), the network access device forwards the packets from the stream to the protected host as the stream is received, but the network access device also builds its own copy of the file from the payloads of these packets. When the set of final packets are received by the network access device, the network access device does not forward the set, but it holds back this set of one or more final packets (also referred to as the set of one or more hold back packets), completes the build of the file, and completes the virus scan (while in certain embodiments the virus scan is not begun until the entire file is built, in other embodiments the virus scan is begun before the entire file is built but is completed after the entire file is built). If a virus is detected, the set of final packets are not sent and the connection is terminated. In response to not receiving the set of final packets, the protected host will discard all of the packets received on the terminated connection; thereby avoiding infection.

In the example illustrated in FIG. 6, at a time 1, a last packet 601 is transmitted along the connection 602. At a time 2, the datastream analysis module 609 copies the payload from the last packet 601 or accesses the payload of the last packet 601 that is stored in memory (e.g., a buffer).

At a time 3, the payload of the last packet 601 is assembled with previous packet payloads 623 into a file 631. The datastream analysis module 609 determines that the last packet 601 is the last packet for the file 631 with any one of a variety of techniques. The datastream analysis module 609 may check the size of the payload, check a sequence number in the header of the last packet 601, etc. At a time 4, the datastream analysis module 609 analyzes (e.g., performs an anti-virus scan) the file 623.

If the file 631 is determined to be non-threatening, then at a time 5.1, the forwarding module 607 forwards the last packet 601 along the connection 602 to the protected host. If the file 631 is determined to be threatening, then at a time 5.2, the last packet 601 and the file 631 are discarded. As previously stated, the last packet 601 and the file 631 may be stored for analytical, statistical, or other purposes.

Even though one or more packets of a threatening file are passed to a protected host, the protected host is not infected because it will discard all of the packets received on the terminated connection. Datastream packet payload file analysis provides anti-virus protection that blocks threatening files before they are received by a protected host. In addition, the complexities and costliness of managing separate connections for a single datastream as with a proxy firewall is avoided with datastream packet payload file analysis which monitors a single connection for a single datastream Although the datastream analysis module and forwarding module are illustrated as separate modules in FIGS. 3-6, various embodiments of the invention may implement the forwarding module and datastream analysis module differently. For example, the forwarding module 307 and the datastream analysis module 309 may be a single module in the network access device 305. In such an embodiment, the combined module would wait to forward each packet until analysis had been completed on each packet. In alternative embodiments of the invention, packets received at the network access device 305 are queued. While in the queue, the datastream analysis module 309 performs the packet header analysis. The datastream packet header analysis is synchronized so that analysis will complete when a packet advances to an entry in the queue before being forwarded.

Figure 7:
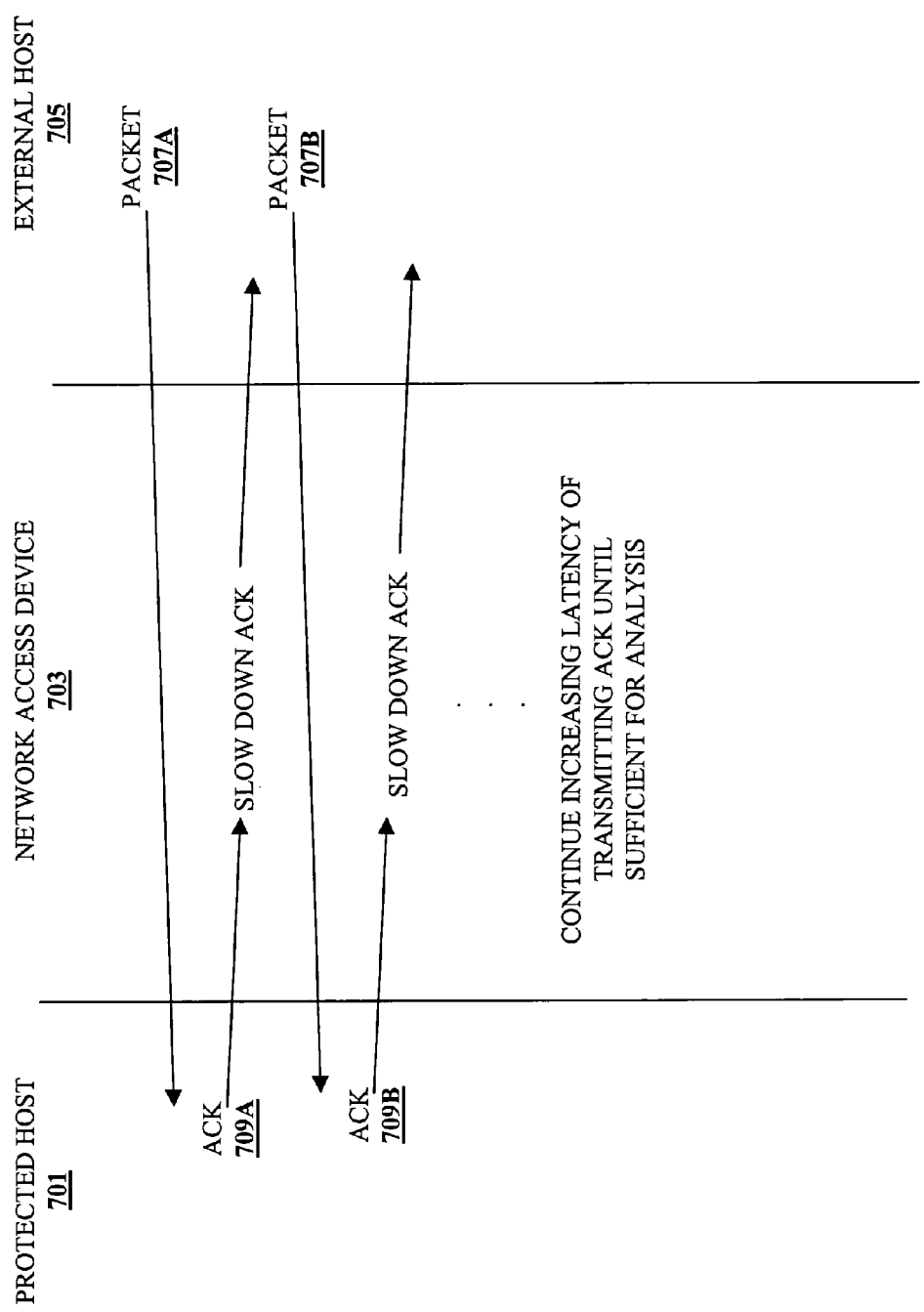
FIG. 7 is an exemplary diagram illustrating retransmission according to one embodiment of the invention.
Figure 8:
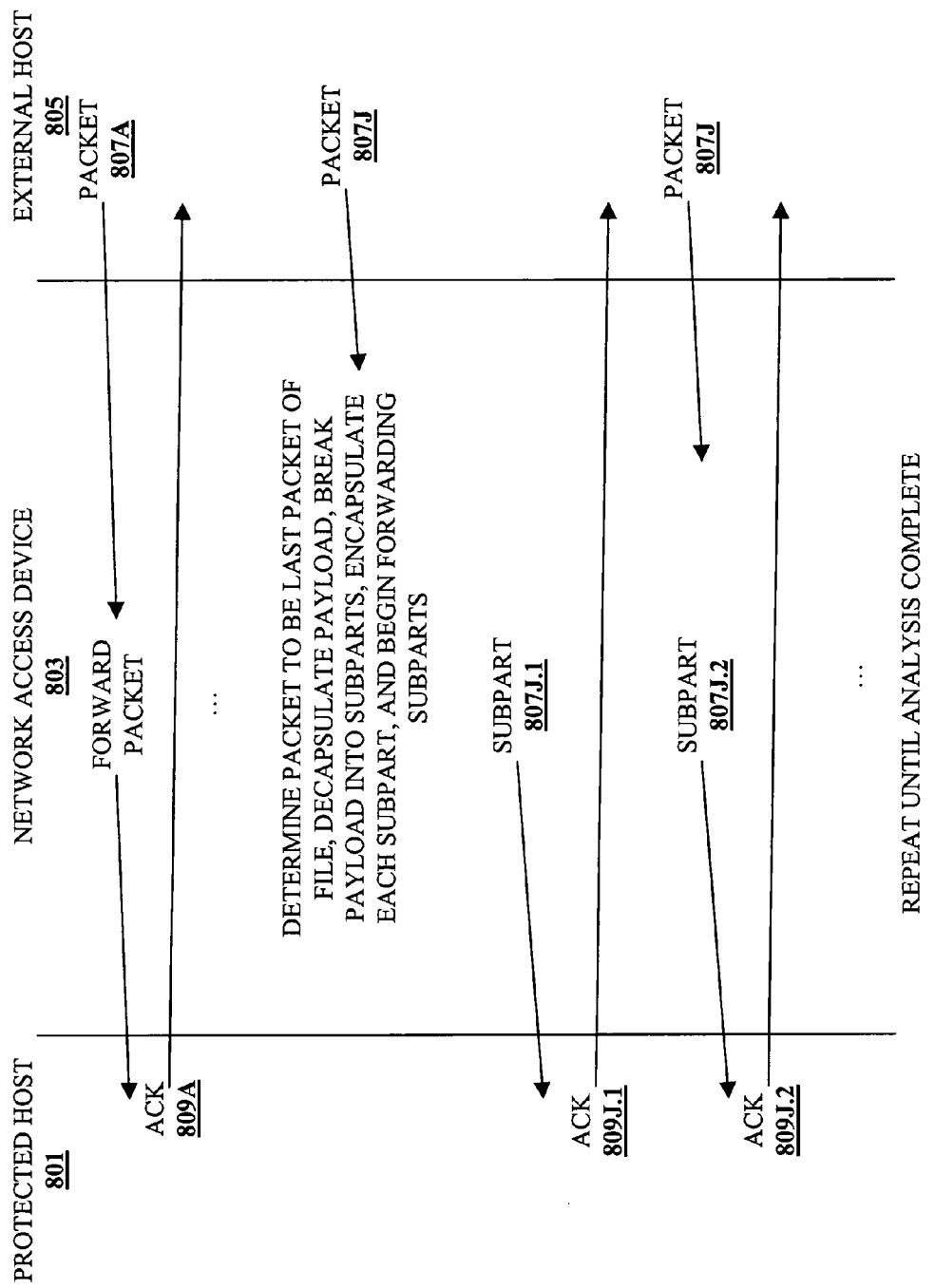
FIG. 8 is an exemplary diagram illustrating throttling according to one embodiment of the invention.
Figure 9:
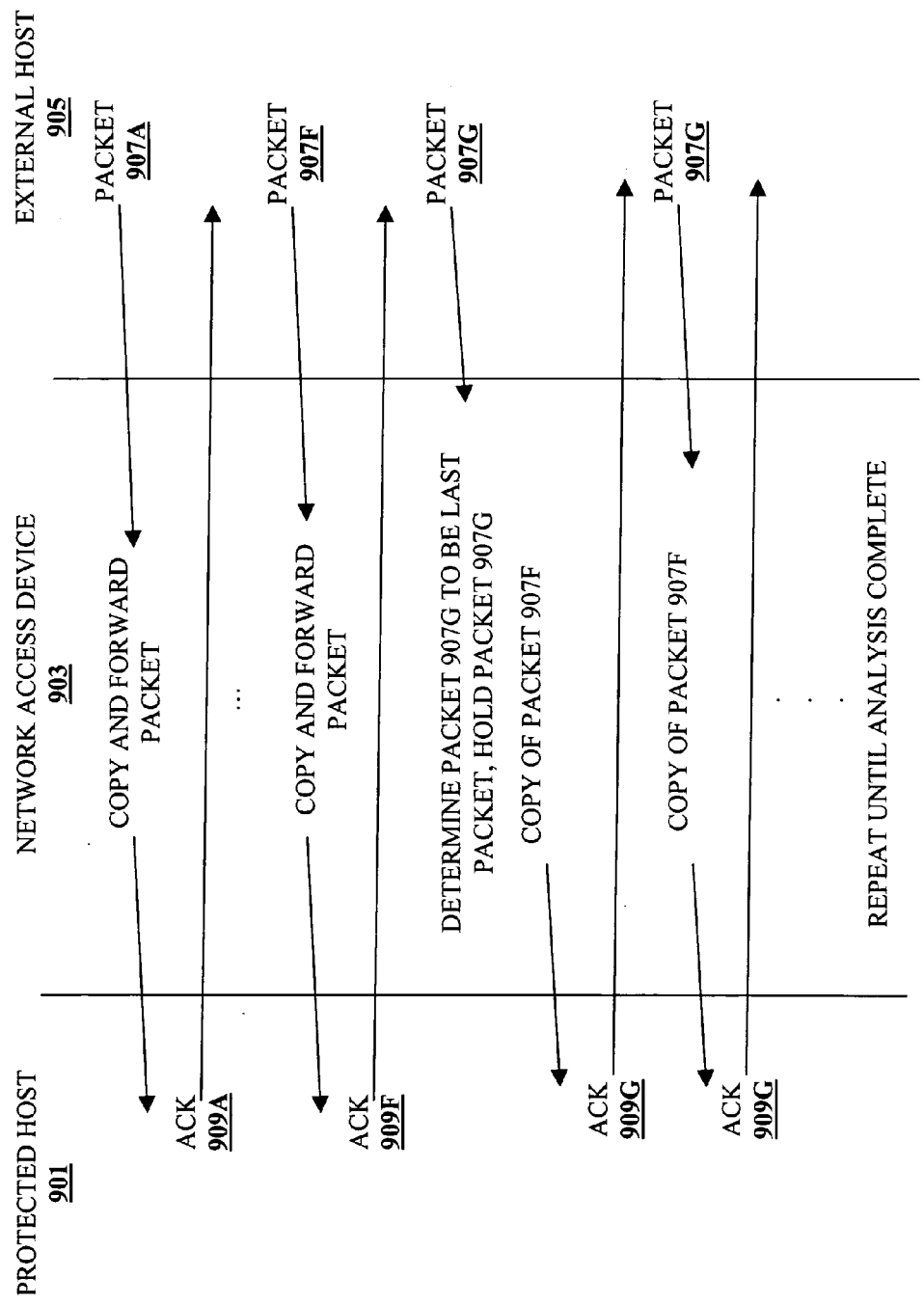
FIG. 9 is an exemplary diagram illustrating retransmission according to one embodiment of the invention.

In certain embodiments of the invention, a connection between an external host and a protected host should be maintained in order to complete datastream payload file analysis. For example, the packet header analysis illustrated in FIG. 4 or the packet payload block analysis illustrated in FIG. 5 may respectively require the connections 402 and 502 to be maintained until analysis has completed. For packet payload file analysis as illustrated in FIG. 6, in addition to the last packet being held to prevent the protected host from assembling a potentially threatening file, the connection 602 may need to be maintained in order for the file scan to complete. FIGS. 7-9 are diagrams illustrating exemplary techniques that may be performed by a forwarding module for maintaining a connection, but these Figure do not repeat illustration of the analysis illustrated in FIGS. 3-6.

FIG. 7 is an exemplary diagram illustrating throttling according to one embodiment of the invention. An external host 705 transmits a packet 707A to a protected host 701 through a network access device 703. The protected host 701 transmits an acknowledgement 709A to the external host 705, but the network access device 703 slows down the acknowledgement 709A as it forwards the acknowledgement 709A to the external host 705. The external host 705 transmits a packet 707B through the network access device 703 to the protected host 701. The protected host 701 transmits an acknowledgement 709B to the external host 705 through the network access device 703. The network access device 703 slows down the acknowledgement 709B, more than the acknowledgement 709A, as the network access device forwards the acknowledgement 709B to the external host 705. The network access device 703 continues to increase latency of acknowledgements received from the protected host 701 destined for the external host 705 to an amount sufficient for the network access device to 703 to analyze each packet (either packet header analysis or packet payload block analysis) without causing the connection to be closed.

FIG. 8 is an exemplary diagram illustrating fragmented packet transmission according to one embodiment of the invention. An external host 805 transmits a packet 807A through a network access device 803 to a protected host 801. The protected host 801 transmits an acknowledgement 809A to the external host 805 through the network access device 803. After a series of packets have been transmitted, the external host 805 attempts to transmit a packet 807J to the protected host 801, but the network access device 803 intercepts the packet 807J. The network access device 803 determines that the packet 807J is the last packet in the stream as previously described in FIG. 6.

The network access device 803 decapsulates a payload from the packet 807J, fragments the payload into subparts, and encapsulates each subpart. The network access device 803 then begins to forward each of the encapsulated subparts. The network access device 803 transmits the subpart packet 807J.1 to the protected host 801. The protected host 801 transmits an acknowledgement 809J.1 through the network access device 803 to the external host 805. The acknowledgement 809J.1 indicates that it has received a part of the packet 807J. In response to the acknowledgement 809J.1, the external host 805 retransmits the packet 807J. The network access device 803 transmits a subpart 807J.2 to the protected host 801. The protected host 801 transmits an acknowledgement 809J.2 to the external host 805. This process is repeated until analysis of the packet 807J or a file assembled from packets 807A-807J has been completed.

FIG. 9 is an exemplary diagram illustrating retransmission according to one embodiment of the invention. In FIG. 9, an external host 905 transmits a packet 907A to the protected host 901 through the network access device 903. The network access device 903 copies and forwards the packet 907A. The protected host 901 transmits an acknowledgement 909A to the external host 905. The external host 905 transmits a series of packets after transmitting the packet 907A and the protected host 901 responds with an acknowledgment for each of the received packets.

The external host 905 transmits the packet 907F to the protected host 901. Once again, the network access device 903 copies and forwards the packet 907F. The copy of the packet transmitted prior to the packet 907F is discarded and overwritten by the packet 907F. An acknowledgement 909F is transmitted from the protected host 901 to the external host 905 through the network access device 903. The external host 905 transmits the packet 907G to the network access device 903. The network access device 903, in FIG. 9, determines that the packet 907G is the last packet (e.g., as previously described in FIG. 6) and holds the last packet 907G. The network access device 903 transmits the packet 907F (actually a copy of the already transmitted packet 907F) to the protected host 901. The protected host 901 transmits an acknowledgement 909F to the external host 905 again acknowledging receipt of the packet 907F.

Since the protected host 901 has indicated that it received the packet 907F, the external host 905 transmits the packet 907G again through the network access device 903. The network access device 903 retransmits the packet 907F to the protected host 901. The protected host 901 transmits the acknowledgement 909F to the external host 905, again acknowledging receipt of the packet 907F. The network access device 903 continues to retransmit the packet 907F (the next to last packet) until analysis of the packet and/or the file has been completed.

Figure 10:
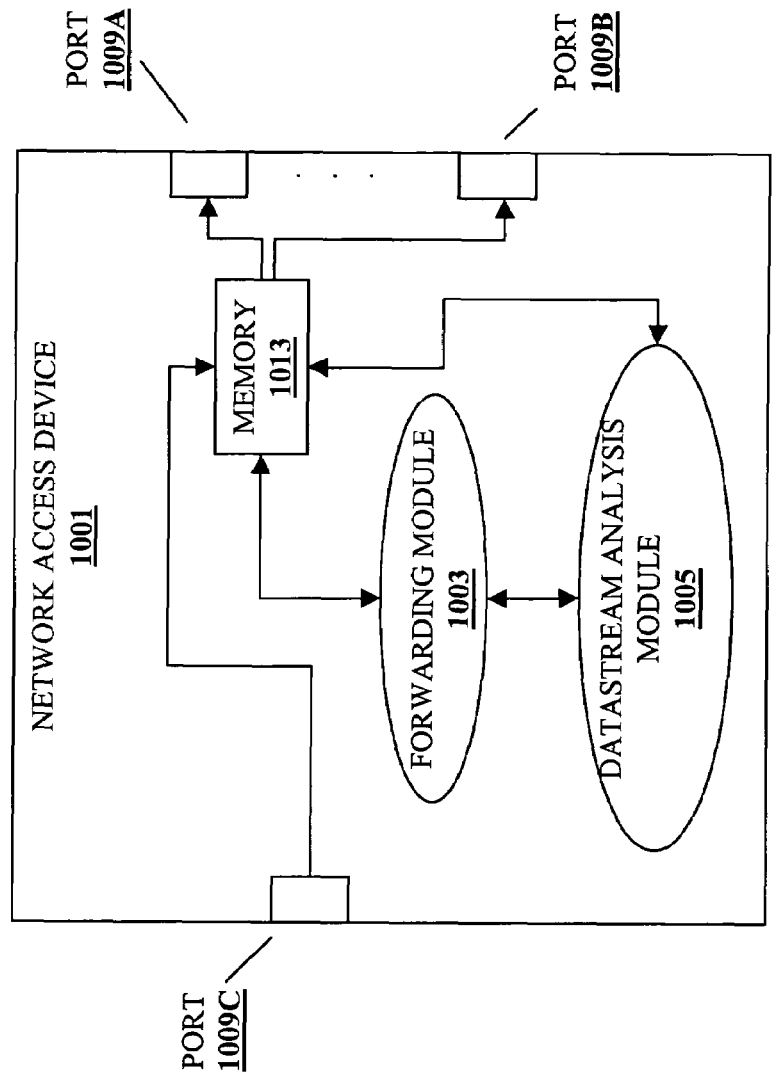
FIG. 10 is a diagram illustrating an exemplary network access device according to one embodiment of the invention.

FIG. 10 is a diagram illustrating an exemplary network access device according to one embodiment of the invention. In FIG. 10, a network access device 1001 includes ports 1009A-1009C. The ports 1009A and 1009B transmit and receive data to and from protected hosts. The port 1009C transmits and receives data to and from an external host. The network access device 1001 also includes a memory 1013 that is coupled with the ports 1009A-1009C. The network access device 1001 further includes a forwarding module 1003 and a datastream analysis module 1005. The forwarding module 1003 is coupled with the datastream analysis module and the memory 1013. The datastream analysis module is also coupled with the memory 1013.

The hosts and network access devices described in the Figures include memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other forms of propagated signals (e.g., carrier waves, infrared signals, digital signals, etc.), etc.

The network access device illustrated in the Figures may be remotely coupled with or directly coupled to a protected host. In alternative embodiments of the invention, the operations performed by the network access device are implemented on a machine-readable medium within a protected host.

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

I claim:

1. A method in a network access device comprising:
   without proxying, analyzing each of a stream of packets traversing a single connection through the network access device from an external host to a protected host;
   forwarding each allowed packet of the stream of packets as long as the connection is active, wherein forwarding each allowed packet comprises transmitting a message indicating that each allowed packet is allowed; and
   if one of the stream of packets is determined to be disallowed by said analyzing, then discarding the disallowed packet and terminating the connection, causing the protected host to discard those packets received on the terminated connection.

2. The method of claim 1 wherein analyzing each of the stream of packets comprises inspecting a header of each of the stream of packets against a packet filter.

3. The method of claim 1 wherein analyzing each of the stream of packets comprises inspecting a payload of each of the stream of packets for disallowed content.

4. The method of claim 3 wherein inspecting the payload of each of the stream of packets comprises copying the payload, analyzing the payload, and discarding the corresponding packet if the payload is threatening.

5. The method of claim 1 further comprising:
   copying a payload from each of a plurality of packets that comprise a file, the stream of packets including the plurality of packets;
   forwarding all but the last of the plurality of packets to the protected host;
   reassembling the plurality of packets into the file;
   analyzing the file;
   if the file is a threatening file then discarding the last packet and terminating the connection; and
   if the file is non-threatening, then forwarding the last packet.

6. A computer implemented method comprising:
   copying a packet payload of each of a plurality of packets received on a single connection between an external host and a protected host that carries a stream of packets the stream of packets including the plurality of packets;
   forwarding all but the last of the plurality of packets to the protected host;
   reassembling the copied packet payloads into a file;
   analyzing the file to determine if the file is allowed or disallowed;
   maintaining the connection while analyzing the file, said maintaining comprising copying each of the plurality of packets but the last packet before forwarding each of the plurality of packets, and
   holding the last packet and repeatedly forwarding the last copied packet;
   if the file is allowed, then forwarding the last packet to the protected host; and
   if the file is determined to be disallowed, then dropping the last packet and terminating the connection.

7. The computer implemented method of claim 6 wherein the analyzing the file comprises performing anti-virus analysis on the file.

8. The computer implemented method of claim 6 further comprising:
   analyzing a header of each of the stream of packets; and
   if one of the stream of packets is determined to be disallowed, then discarding the disallowed packet and terminating the connection.

9. The computer implemented method of claim 8 wherein analyzing the header comprises inspecting addresses indicated in the header against a packet filter.

10. The computer implemented method of claim 6 further comprising:
    individually analyzing each of the copied packet payloads; and
    if one of the copied packet payloads is determined to be threatening, then discarding the corresponding packet and terminating the connection.

11. The computer implemented method of claim 10 wherein analyzing each of the copied packet payloads comprises inspecting each copied packet payload against a list of disallowed content and determining if each copied packet payload includes threatening script.

12. The computer implemented method of claim 6, wherein maintaining the connection comprises increasing transmission latency of each acknowledgement transmitted from the protected host to the external host until the analysis is complete.

13. A computer implemented method comprising:
    copying a packet payload of each of a plurality of packets received on a single connection between an external host and a protected host that carries a stream of packets the stream of rackets including the plurality of packets;
    forwarding all but the last of the plurality of packets to the protected host;
    reassembling the copied packet payloads into a file;
    analyzing the file to determine if the file is allowed or disallowed;
    maintaining the connection while analyzing the file, wherein maintaining the connection comprises:

decapsulating the last packet's payload,
fragmenting the last packet's payload into subparts,
encapsulating each subpart, and
forwarding each subpart until analysis is complete;
if the file is allowed, then forwarding the last packet to the protected host; and
if the file is determined to be disallowed, then dropping the last packet and terminating the connection.

14. A computer implemented method comprising:
copying a packet payload of each of a plurality of packets received on a single connection between an external host and a protected host that carries a stream of packets the stream of packets including the plurality of packets;
forwarding all but the last of the plurality of packets to the protected host;
reassembling the copied packet payloads into a file;
analyzing the file to determine if the file is allowed or disallowed;
if the file is allowed, then forwarding the last packet to the protected host, wherein forwarding each of the plurality of packets comprises transmitting a message indicating that each of the of the plurality of packets is allowed; and
if the file is determined to be disallowed, then dropping the last packet and terminating the connection.

15. A computer implemented method comprising:
supporting a connection from an external host to a protected host;
analyzing a header of each packet received over the connection from the external host;
terminating the connection if a first packet received over the connection is determined to be disallowed and discarding the first packet;
if the connection is not terminated, copying the first packet's payload;
analyzing the first packet's payload;
terminating the connection if said first packet's payload is determined to be disallowed and discarding the first packet;
if the connection has not been terminated and if said first packet's payload is not a last block of a file, then forwarding said first packet to the protected host;
if said first packet's payload is the last block of a file, then reassembling the first packet's payload with a set of one or more previously copied packet payloads into the file;
analyzing the file to determine if the file is allowed or disallowed;
maintaining the connection while analyzing the file, said maintaining comprising copying each of the plurality of packets but the last packet before forwarding each of the plurality of packets, and
holding the last packet and repeatedly forwarding the last copied packet;
if the file is disallowed then dropping the first packet and terminating the connection; and
if the file is allowed then forwarding the first packet.

16. The computer implemented method of claim 15 wherein maintaining the connection comprises increasing transmission latency of each acknowledgement transmitted from the protected host to the external host until the analysis is complete.

17. The computer implemented method of claim 15 wherein the analyzing the file comprises performing anti-virus analysis on the file.

18. The computer implemented method of claim 15 wherein analyzing the header comprises inspecting addresses indicated in the header against a packet filter.

19. The computer implemented method of claim 15, wherein analyzing the first packet's payload comprises inspecting the first packet's payload against a list of disallowed content and determining if the first packet's payload includes threatening script.

20. A computer implemented method comprising:
supporting a connection from an external host to a protected host;
analyzing a header of each packet received over the connection from the external host;
terminating the connection if a first packet received over the connection is determined to be disallowed and discarding the first packet;
if the connection is not terminated, copying the first packet's payload;
analyzing the first packet's payload;
terminating the connection if said first packet's payload is determined to be disallowed and discarding the first packet;
if the connection has not been terminated and if said first packet's payload is not a last block of a file, then forwarding said first packet to the protected host;
if said first packet's payload is the last block of a file, then reassembling the first packet's payload with a set of one or more previously copied packet payloads into the file;
analyzing the file to determine if the file is allowed or disallowed;
maintaining the connection while analyzing the file, wherein maintaining the connection comprises:
decapsulating the last packet's payload,
fragmenting the last packet's payload into subparts,
encapsulating each subpart, and
forwarding each subpart until analysis is complete;
if the file is disallowed then dropping the first packet and terminating the connection; and
if the file is allowed then forwarding the first packet.

21. An apparatus comprising:
a forwarding module to forward packets of a datastream along a connection between a protected host and an external host; and
a datastream analysis module coupled with the forwarding module, the datastream analysis module to analyze each of the packets to determine if each of the packets are allowed or disallowed and to terminate the connection upon determining one of the packets to be disallowed and to discard the disallowed packet, causing the protected host to discard packets received on the terminated connection prior to the disallowed packet, wherein the forwarding module is operable to maintain the connection while the analysis module is analyzing the packets by copying each of the packets but the last packet before forwarding each of the packets, and holding the last packet and repeatedly forwarding the last copied packet.

22. The apparatus of claim 21 further comprising a memory to store each of the packets until forwarded or discarded.

23. The apparatus of claim 21 further comprising a memory coupled with the datastream analysis module, the memory to store copies of each of the packets' payloads.

24. A readable storage medium that provides instructions, which when executed by a set of one or more processors, cause said set of processors to perform operations comprising:

without proxying, analyzing each of a stream of packets traversing a single connection through the network access device from an external host to a protected host;

forwarding each allowed packet of the stream of packets as long as the connection is active, wherein forwarding each allowed packet comprises transmitting a message indicating that each allowed packet is allowed; and if one of the stream of packets is determined to be disallowed by said analyzing, then discarding the disallowed packet and terminating the connection, causing the protected host to discard those packets received on the terminated connection.

25. The readable storage medium of claim 24 wherein analyzing each of the stream of packets comprises inspecting a header of each of the stream of packets against a packet filter.

26. The readable storage medium of claim 24 wherein analyzing each of the stream of packets comprises inspecting a payload of each of the stream of packets for disallowed content.

27. The readable storage medium of claim 26 wherein inspecting the payload of each of the stream of packets comprises copying the payload, analyzing the payload, and discarding the corresponding packet if the payload is threatening.

28. The readable storage medium of claim 24 further comprising:
copying a payload from each of a plurality of packets that comprise a file, the stream of packets including the plurality of packets;
forwarding all but the last of the plurality of packets to the protected host;
reassembling the plurality of packets into the file;
analyzing the file;
if the file is a threatening file then discarding the last packet and terminating the connection; and
if the file is non-threatening, then forwarding the last packet.

29. A readable storage medium that provides instructions, which when executed by a set of one or more processors, cause said set of processors to perform operations comprising:
copying a packet payload of each of a plurality of packets received on a single connection between an external host and a protected host that carries a stream of packets the stream of packets including the plurality of packets;
forwarding all but the last of the plurality of packets to the protected host, wherein forwarding each of the plurality of packets comprises transmitting a message indicating that each of the of the plurality of packets is allowed;
reassembling the copied packet payloads into a file;
analyzing the file to determine if the file is allowed or disallowed;
if the file is allowed, then forwarding the last packet to the protected host; and
if the file is determined to be disallowed, then dropping the last packet and terminating the connection.

30. The readable storage medium of claim 29 wherein the analyzing the file comprises performing anti-virus analysis on the file.

31. The readable storage medium of claim 29 further comprising:
analyzing a header of each of the stream of packets; and
if one of the stream of packets is determined to be disallowed, then discarding the disallowed packet and terminating the connection.

32. The readable storage medium of claim 31 wherein analyzing the header comprises inspecting addresses indicated in the header against a packet filter.

33. The readable storage medium of claim 29 further comprising:
individually analyzing each of the copied packet payloads; and
if one of the copied packet payloads is determined to be threatening, then discarding the corresponding packet and terminating the connection.

34. The readable storage medium of claim 33 wherein analyzing each of the copied packet payloads comprises inspecting each copied packet payload against a list of disallowed content and determining if each copied packet payload includes threatening script.

35. The readable storage medium of claim 29 further comprising maintaining the connection while analyzing the file.

36. The readable storage medium of claim 35 wherein maintaining the connection comprises increasing transmission latency of each acknowledgement transmitted from the protected host to the external host until the analysis is complete.

37. A readable storage medium that provides instructions, which when executed by a set of one or more processors, cause said set of processors to perform operations comprising:
copying a racket payload of each of a plurality of rackets received on a single connection between an external host and a protected host that carries a stream of packets the stream of packets including the plurality of packets;
forwarding all but the last of the plurality of packets to the protected host;
reassembling the copied packet payloads into a file;
analyzing the file to determine if the file is allowed or disallowed;
maintaining the connection while analyzing the file, wherein maintaining the connection comprises:
decapsulating the last packet's payload,
fragmenting the last packet's payload into subparts,
encapsulating each subpart, and
forwarding each subpart until analysis is complete;
if the file is allowed, then forwarding the last racket to the protected host; and if the file is determined to be disallowed, then dropping the last packet and terminating the connection.

38. A readable storage medium that provides instructions, which when executed by a set of one or more processors, cause said set of processors to perform operations comprising:
copying a packet payload of each of a plurality of packets received on a single connection between an external host and a protected host that carries a stream of packets the stream of packets including the plurality of packets;
forwarding all but the last of the plurality of packets to the protected host;
reassembling the copied packet payloads into a file;
analyzing the file to determine if the file is allowed or disallowed;
maintaining the connection while analyzing the file, wherein maintaining the connection comprises:
copying each of the plurality of packets but the last packet before forwarding each of the plurality of packets, and holding the last packet and repeatedly forwarding the last copied packet;

if the file is allowed, then forwarding the last packet to the protected host; and if the file is determined to be disallowed, then dropping the last packet and terminating the connection.

39. A readable storage medium that provides instructions, which when executed by a set of one or more processors, cause said set of processors to perform operations comprising:

supporting a connection from an external host to a protected host;

analyzing a header of each packet received over the connection from the external host;

terminating the connection if a first packet received over the connection is determined to be disallowed and discarding the first packet;

if the connection is not terminated, copying the first packet's payload;

analyzing the first packet's payload;

terminating the connection if said first packet's payload is determined to be disallowed and discarding the first packet;

if the connection has not been terminated and if said first packet's payload is not a last block of a file, then forwarding said first packet to the protected host;

if said first packet's payload is the last block of a file, then reassembling the first packet's payload with a set of one or more previously copied packet payloads into the file;

analyzing the file to determine if the file is allowed or disallowed;

maintaining the connection while analyzing the file, said maintaining comprising
  decapsulating the last packet's payload,
  fragmenting the last packet's payload into subparts,
  encapsulating each subpart, and
  forwarding each subpart until analysis is complete;

if the file is disallowed then dropping the first packet and terminating the connection; and if the file is allowed then forwarding the first packet.

40. The readable storage medium of claim 39, wherein maintaining the connection comprises increasing transmission latency of each acknowledgement transmitted from the protected host to the external host until the analysis is complete.

41. The readable storage medium of claim 39 wherein the analyzing the file comprises performing anti-virus analysis on the file.

42. The readable storage medium of claim 39 wherein analyzing the header comprises inspecting addresses indicated in the header against a packet filter.

43. The readable storage medium of claim 39 wherein analyzing the first packet's payload comprises inspecting the first packet's payload against a list of disallowed content and determining if the first packet's payload includes threatening script.

44. A readable storage medium that provides instructions, which when executed by a set of one or more processors, cause said set of processors to perform operations comprising:

supporting a connection from an external host to a protected host;

analyzing a header of each packet received over the connection from the external host;

terminating the connection if a first racket received over the connection is determined to be disallowed and discarding the first packet;

if the connection is not terminated, copying the first packet's payload;

analyzing the first packet's payload;

terminating the connection if said first packet's payload is determined to be disallowed and discarding the first packet;

if the connection has not been terminated and if said first packet's payload is not a last block of a file, then forwarding said first racket to the protected host;

if said first packet's payload is the last block of a file, then reassembling the first packet's payload with a set of one or more previously copied racket payloads into the file;

analyzing the file to determine if the file is allowed or disallowed;

maintaining the connection while analyzing the file, wherein maintaining the connection comprises:
  copying each of the plurality of packets but the last packet before forwarding each of the plurality of packets, and
  holding the last packet and repeatedly forwarding the last copied packet;

if the file is disallowed then dropping the first packet and terminating the connection; and if the file is allowed then forwarding the first packet.

* * * * *